(12) United States Patent
Santosuosso et al.

(10) Patent No.: US 9,275,102 B2
(45) Date of Patent: Mar. 1, 2016

(54) SYSTEM LOAD QUERY GOVERNOR

(75) Inventors: John M. Santosuosso, Rochester, MN (US); Brandon W. Schulz, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 570 days.

(21) Appl. No.: 13/186,786

(22) Filed: Jul. 20, 2011

(65) Prior Publication Data

US 2013/0024442 A1 Jan. 24, 2013

(51) Int. Cl.
*G06F 7/00* (2006.01)
*G06F 17/30* (2006.01)

(52) U.S. Cl.
CPC .............. *G06F 17/30424* (2013.01)

(58) Field of Classification Search
CPC ............ G06F 17/30424; G06F 17/30442
USPC ......................... 707/713, 719, 720
See application file for complete search history.

(56) References Cited

U.S. PATENT DOCUMENTS

| | | | |
|---|---|---|---|
| 6,223,205 B1* | 4/2001 | Harchol-Balter et al. | 718/105 |
| 6,938,035 B2* | 8/2005 | Driesch et al. | |
| 7,493,304 B2* | 2/2009 | Day et al. | |
| 7,756,856 B2* | 7/2010 | Day | G06F 17/30442 707/713 |
| 8,290,937 B2* | 10/2012 | Barsness et al. | 707/719 |
| 8,321,443 B2* | 11/2012 | Andrade et al. | 707/760 |
| 2004/0172385 A1* | 9/2004 | Dayal | 707/3 |
| 2006/0161517 A1* | 7/2006 | Bhattacharjee et al. | 707/2 |
| 2009/0024563 A1* | 1/2009 | Sengar | 707/2 |

* cited by examiner

*Primary Examiner* — Cheyne D Ly
(74) *Attorney, Agent, or Firm* — Patterson & Sheridan, LLP (57) ABSTRACT

Techniques are disclosed for query processing. In one embodiment, a query is received for execution in a processing environment. Based on a measure of current load of the processing environment, a maximum amount of a resource that the query is allowed to consume is determined. An amount of the resource that the query is to consume is estimated. Execution of the query is managed based on a comparison between the maximum amount and the estimated amount.

20 Claims, 5 Drawing Sheets

SYSTEM LOAD QUERY GOVERNOR

BACKGROUND

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests are often made using high-level query languages such as Structured Query Language (SQL). Upon receiving such a request, the DBMS may execute the request against a corresponding database, and return any result of the execution to the requesting entity.

SUMMARY

Embodiments of the invention provide a method, product and system for performing an operation that includes receiving a query from a requesting entity, for execution in a processing environment. The operation also includes determining a maximum amount of a resource that the query is allowed to consume, based on a measure of current load of the processing environment. The operation also includes determining an estimated amount of the resource, wherein the estimated amount comprises an amount of the resource that the query is likely to consume. The operation also includes managing execution of the query, based on a comparison between the maximum amount and the estimated amount.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for managing execution of queries. One embodiment provides a query governor configured to manage execution of one or more queries submitted to a DBMS for execution, where the DBMS executes in a processing environment that includes one or more computer systems. To this end, the query governor may limit one or more resources consumed by the query. Examples of resources include query execution time, number of processor cycles used in query execution, amount of memory used in query execution, amount of storage capacity and/or bandwidth used during query execution, amount of network bandwidth used during query execution, etc. The query governor may limit the one or more resources by setting maximum thresholds for the one or more resources. Each maximum threshold may be determined based on one or more measures of current load of the computer system. Each measure of current load characterizes resource utilization in the processing environment, as a result of applications executed by the processing environment. Examples of measures of current load include processor utilization, memory utilization, storage utilization in terms of capacity and/or bandwidth, network utilization, etc.

In one embodiment, the query governor may set lower maximum thresholds when the processing environment is being heavily utilized and higher maximum thresholds when the processing environment is being underutilized. The query governor may then manage execution of the one or more queries based on the maximum thresholds. For example, if a query that is pending execution is estimated to exceed one or more of the maximum thresholds, the query governor may reject execution of the query. Such a rejection may be definitive (e.g., a message may be returned to the requesting entity, explaining that the query was denied for processing) or the execution may be delayed to another time (e.g., the system may process the query once system resources become idle). In some embodiments, if an executing query exceeds or is estimated to exceed one or more of the maximum thresholds, the query governor may suspend or halt execution of the query. Advantageously, the query governor may manage query execution in a manner that is more responsive to the needs of the processing environment at least in some cases. For example, the query governor may allow fewer queries to execute when the processing environment is being heavily utilized. Further, the query governor may allow more queries to execute when the processing environment is not being as heavily utilized.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., a DBMS) or related data available in the cloud. For example, the DBMS could execute on a computing system in the cloud and receive queries pertaining to one or more databases managed by the DBMS. In such a case, a query governor 182 could monitor incoming queries and, for each query, calculate an estimated execution time for executing the query. The query governor 182 may also determine a maximum allowable runtime for the query, based on one or more measures of current system load. Doing so allows a user to submit queries from any computing system attached to a network connected to the cloud (e.g., the Internet) and allows the query governor 182 to be sensitive to the processing environment in which it is executing.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1A:
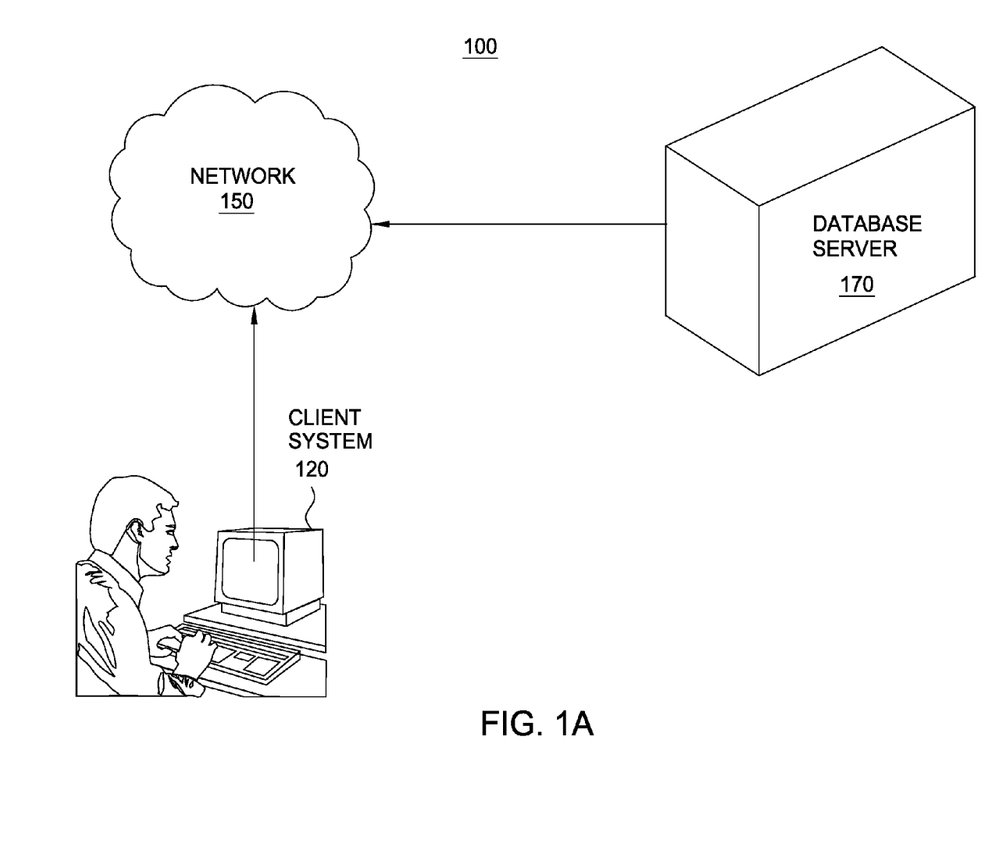
FIGS. 1A-1B are block diagrams illustrating systems configured to execute a query governor, according to embodiments of the invention.
Figure 1B:
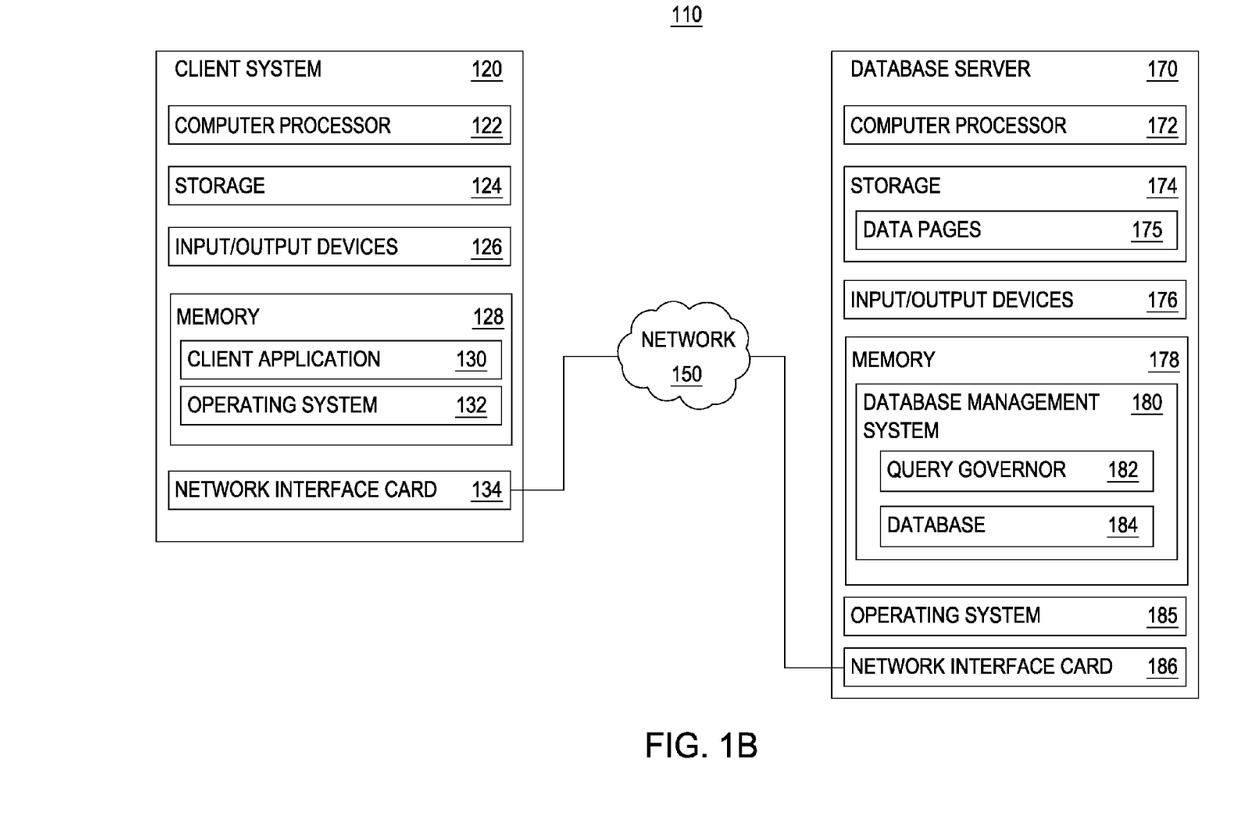

FIGS. 1A-1B are block diagrams illustrating systems configured to execute a query governor, according to embodiments of the present invention. More specifically, FIG. 1A is a block diagram illustrating a networked system for managing query execution using a query governor. As shown, the system 100 includes a client system 120 and a database server 170, connected by a network 150. Generally, the client system 120 may submit requests (e.g., queries) over the network 150 to a DBMS running on the database server 170. The term "query" denotes a set of commands for retrieving data from a stored database. Queries may take the form of a command language, such as the Structured Query Language (SQL), and enable programmers and programs to select, insert, update, and determine the location of data in the database.

Generally speaking, any requesting entity can issue queries against data in a database. For example, software applications (such as by an application running on the client system 120), operating systems, and, at the highest level, users may submit queries to the database. These queries may be predefined (i.e., hard coded as part of an application) or may be generated in response to input (e.g., user input). Upon receiving the request, the DBMS on the database server 170 may execute the request on a database specified in the request and then return a result of the executed request.

FIG. 1B is a block diagram illustrating a system configured to execute a query governor, according to one embodiment of the present invention. As shown, the system 110 contains the client system 120 and the database server 170. The client system 120 contains a computer processor 122, storage media 124, I/O devices 126, memory 128 and a network interface card 134. Computer processor 122 may be any processor capable of performing the functions described herein. The client system 120 may connect to the network 150 using the network interface card 134. Furthermore, as will be understood by one of ordinary skill in the art, any computer system capable of performing the functions described herein may be used.

Illustratively, memory 128 contains a client application 130 and an operating system 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 130 is generally capable of generating database queries. Once the client application 130 generates a query, the query may be submitted to a server (e.g., DBMS 180) for execution, using the network 150. The operating system 132 may be any operating system capable of performing the functions described herein.

The database server 170 contains a computer processor 172, storage media 174, I/O devices 176, memory 178 and a network interface 186. Computer processor 172 may be any processor capable of performing the functions described herein. As shown, storage media 174 contains data pages 175. The data pages 175 generally contain one or more rows of data. In one embodiment of the invention, data contained in the data pages 175 is associated with one or more key values in the database 184. I/O devices 226 may represent a variety of input and output devices, including keyboards, mice, visual displays, printers and so on. The database server 170 may connect to the network 150 using the network interface card 186. Furthermore, as will be understood by one of ordinary skill in the art, any computer system capable of performing the functions described herein may be used.

In the pictured embodiment, memory 178 contains an operating system 185 and a database management system (DBMS) 180. Although the memory 178 is shown as a single entity, the memory 178 may include one or more memory devices having blocks of memory associated with physical addresses, such as random access memory (RAM), read only memory (ROM), flash memory or other types of volatile and/or non-volatile memory. The DBMS 180 includes a query governor 182 and a database 184. The operating system 185 may be any operating system capable of performing the functions described herein.

In one embodiment, the query governor 182 receives a query for execution in a processing environment (i.e., the database server 170). The query governor 182 determines a maximum amount of the resource that the query is allowed to consume, based one or more measures of current load of the processing environment. The determined maximum amount may apply to all queries within a predetermined time period (e.g., until the load of the processing environment is next assessed) or only to one or more specific queries. As described above, examples of measures of current load include processor utilization, memory utilization, storage utilization in terms of capacity and/or bandwidth, network utilization, etc. At least in some embodiments, the measures may be retrieved from the operating system 185 via one or more application programming interfaces (APIs) provided by the operating system 185. In other embodiments, the measures may be retrieved from a monitoring component of the DBMS, where the monitoring component is configured to monitor performance metrics of the DBMS.

At least in some embodiments, the user or application submitting the query may specify a suggested maximum amount as part of the query. For example, the query may include a SQL keyword specifying the suggested maximum amount. The SQL keyword may be vendor-specific or vendor-independent. In another embodiment, the query governor may retrieve the suggested maximum amount associated with the query from one or more configuration files. The query governor may then determine the maximum amount by adjusting the suggested maximum amount based on one or more measures of current load of the processing environment.

In some embodiments, the user or application may also include, in the query, a flag specifying whether the query governor may adjust the maximum amount based on current load of the processing environment. In another embodiment, the user or application submitting the query may specify a range of permissible values for the maximum amount. In this scenario, the query governor may adjust the maximum amount within the range of permissible values, based on current load of the processing environment.

As described above, in one embodiment, when the DBMS 180 receives a query for processing, the query governor 182 determines a maximum amount of a resource that the query is allowed to consume based one or more measures of current load of the processing environment, i.e., the database server 170. The maximum amount may also be determined at least in part based on one or more user-specified parameters in the query or in a configuration file. The parameters may specify a permissible range of values for the maximum threshold. The permissible range of values may be expressed in terms of units of the resource (within fifty to twenty seconds of query execution time) or in terms of percentages of a default threshold (e.g., within −25 to 25 percent of a default query execution time of twenty seconds).

In one embodiment, the query governor 182 may additionally consider other criteria in determining the maximum amount of the resource that the query is allowed to consume. Such criteria may include, without limitation, a query type, the requesting entity issuing the query, a user identifier associated with the query, and a priority value associated with the query. In such cases, the maximum amount is determined as a function of both the current load of the processing environment and criteria. For example, a user may selectively disable the dependence and/or adjustment of the maximum amount of the resource based on the current load. The dependence and/or adjustment may be disabled for a given query type, requesting entity, user identifier, priority value, etc. Accordingly, the load-dependent functionality of the query governor 182 may be selectively disabled to suit the needs of a particular case.

For instance, assume that there are two applications which submit queries to the DBMS 180: a mission-critical real-time application having a high priority value and a logging application for collecting database statistics having a low priority value. In such an example, for a given system load, the query governor 182 may assign a higher maximum amount for queries received from the mission-critical application than for queries received from the logging application. At least in some embodiments, doing so prioritizes executing queries from the mission-critical application over queries from the logging application, for a given system load.

In one embodiment, the query governor 182 also determines an amount of a resource that the query is likely to consume when executed. The amount may also be referred to herein as an estimated amount of the resource. As described above, examples of resources include query execution time, number of processor cycles used in query execution, amount of memory used in query execution, amount of storage capacity and/or bandwidth used during query execution, amount of network bandwidth used during query execution, etc. The estimated amount may be determined using historical data collected from processing previous queries. Additionally or alternatively, the estimated amount may be determined by generating an access plan for the query and analyzing the access plan to determine an estimated cost for the access plan. The estimated cost for the access plan corresponds to the estimated amount for the query. At least in some embodiments, the access plan is analyzed by a query optimizer component of the DBMS.

As an example, assume that the resource in question is query execution time. Assume further that three previous queries containing SELECT statements for a particular database table took fifteen seconds, twenty seconds and twenty-five seconds to execute. If the database server 170 then receives another query containing a SELECT statement for the particular database table, the query governor may estimate that the query is likely to take an the average of the three previous execution times to execute, i.e., twenty seconds. At least in some embodiments, the historical data may be retrieved from a logging component of the DBMS, where the logging component is configured to log data pertaining to query execution. The logging component may log amounts of resources used in query execution, including query execution time, number of processor cycles used in query execution, amount of memory used in query execution, amount of storage capacity and/or bandwidth used during query execution, amount of network bandwidth used during query execution, etc.

In one embodiment, the query governor may then manage execution of the query, based on a comparison between the maximum amount and the estimated amount. For example, if a query that is pending execution is estimated to exceed one or more of the maximum thresholds, the query governor may reject or delay execution of the query. In some embodiments, if an executing query exceeds or is estimated to exceed one or more of the maximum thresholds, the query governor may suspend or halt execution of the query. Advantageously, the query governor may manage query execution in a manner that is more responsive to the needs of the processing environment.

In some embodiments, rather than merely operating on a single query, the query governor may also operate on a group of queries. In such embodiments, the query governor may approve or reject the entire group for execution, based on a comparison between a maximum amount of resources the group is allowed to consume and an estimated amount of resources the group is likely to consume. Each group may be identified based on predefined criteria, such as based on the issuing application, tables accessed, etc.

Figure 2A:
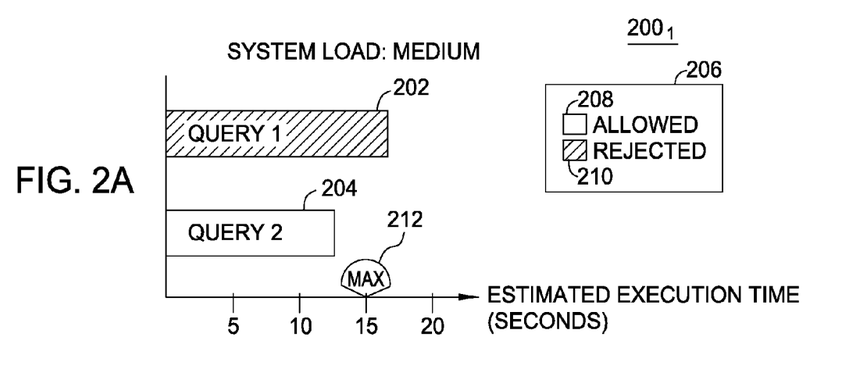
FIGS. 2A-2C are bar graphs depicting amounts of a resource that queries are likely to consume, according to one embodiment of the invention.
Figure 2B:
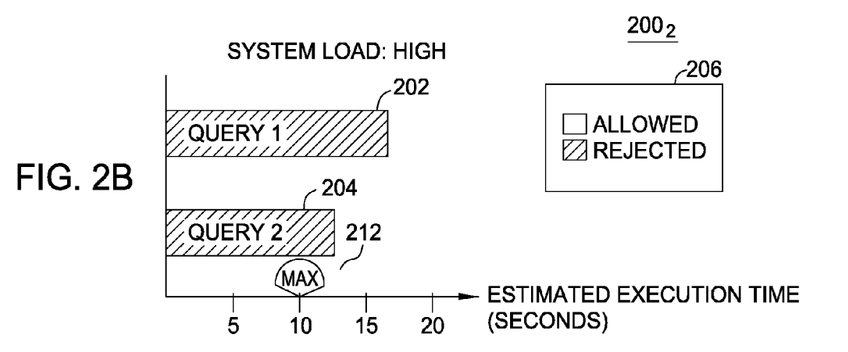
Figure 2C:
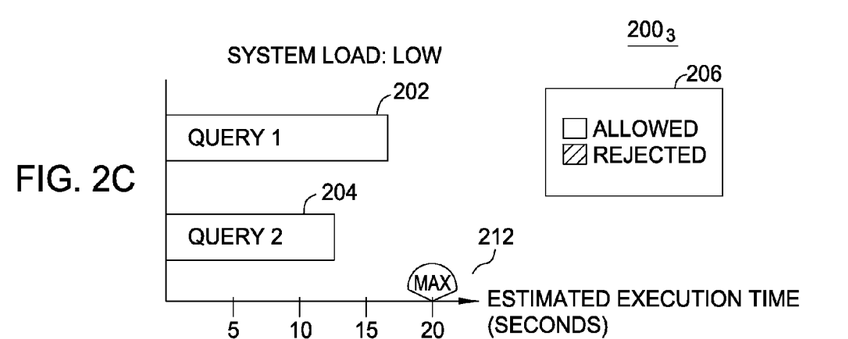

FIGS. 2A-2C are bar graphs $200_{1-3}$ depicting amounts of a resource that queries are likely to consume, according to one embodiment of the invention. Assume that the resource in question is query execution time. Assume further that the query governor 182 determines an estimated execution time of sixteen seconds for a first query and twelve seconds for a second query, respectively. As shown in FIG. 2A, the bar graph $200_1$ includes a first bar 202 representing the estimated execution time for the first query and a second bar 204 representing the estimated execution time for the second query. Suppose that the query governor 182 identifies that the processing environment is experiencing a medium system load. Suppose also that the query governor 182 determines, based on the medium system load, that the maximum allowed execution time should be fifteen seconds. The maximum allowed execution time is represented as a marker 212 in the bar graphs $200_{1-3}$. Accordingly, the query governor 182 rejects the first query from being executed, because the estimated execution time of sixteen seconds exceeds the maximum allowed execution time. On the other hand, the query governor 182 allows the second query to execute, because the estimated execution time of twelve seconds does not exceed the maximum allowed execution time. The bar graphs $200_{1-3}$ include a legend 206 indicating that a solid bar 208 represents an allowed query and a shaded bar 210 represents a rejected query.

Referring now to FIG. 2B, suppose that the processing environment is experiencing a high system load instead of a medium system load. In one embodiment, the query governor 182 determines, based on the high system load, that the maximum allowed execution time should be ten seconds instead of fifteen seconds. The maximum allowed execution time of ten seconds is represented by the marker 212 in FIG. 2B. Because the estimated execution times of the queries—which are sixteen and twelve seconds, respectively—exceed the maximum allowed execution time of ten seconds, the query governor 182 rejects both queries from being executed. Accordingly, lowering the maximum allowed execution time during times of high system load may prevent the processing environment from being overwhelmed with requests at least in some cases.

Referring now to FIG. 2C, suppose that the processing environment is experiencing a low system load instead of a medium system load. In one embodiment, the query governor 182 determines, based on the low system load, that the maximum allowed execution time should be twenty seconds instead of fifteen seconds. The maximum allowed execution time of twenty seconds is represented by the marker 212 in FIG. 2C. Because the estimated execution times of the queries do not exceed the maximum allowed execution time of twenty seconds, the query governor 182 allows both queries to be executed. Accordingly, increasing the maximum allowed execution time during times of low system load may prevent the processing environment from being underutilized at least in some cases. In some embodiments, such as during times of very low system load, the query governor 182 may allow all queries to run, regardless of estimated amounts of resources. For instance, the maximum amount may be set to a predefined value representing infinity. Additionally or alternatively, some or all of the functionality of the query governor 182 may be disabled in this scenario, such that the DBMS no longer incurs the overhead of determining maximum and/or estimated amounts of resources.

Although embodiments are described herein with reference to exemplary query execution time as the maximum and/or estimated resource amounts, those skilled in the art will recognize that the techniques herein may be applied to other resources, such as number of processor cycles used in query execution, amount of memory used in query execution, amount of storage capacity and/or bandwidth used during query execution, and amount of network bandwidth used during query execution. For example, in an alternative embodiment, the maximum amount of resource that a query is allowed to consume specifies a maximum amount of memory of 128 megabytes (MB) under a medium system load, 64 MB under a high system load, and 256 MB under a low system load. In some embodiments, the query governor 182 imposes multiple constraints on each query, each constraint corresponding to a different resource. In such scenarios, the query governor 182 allows a query to execute only when all or a predefined number of the constraints are satisfied by the respective query.

Further, in one embodiment, the query governor 182 also evaluates currently executing queries against the maximum amount, to determine if any of the currently executing queries should be suspended or halted. Although the query governor 182 may previously have allowed the queries to execute, the system load of the processing environment may since have increased to such an extent as to warrant suspending or halting the previously allowed queries mid-execution. For example, suppose that the query governor 182 issues, for execution, a query estimated to take ten minutes to execute, because the query does not exceed a maximum execution time of fifteen minutes. Suppose that five minutes after issuing the query, the query governor 182 determines a new maximum execution time of two minutes, as a result of a sudden increase in system load of the processing environment. Because the remaining execution time of the query (i.e., five minutes) exceeds the new maximum execution time, the query governor 182 may suspend or halt the execution of the query. In some embodiments, it may not be desirable to halt and/or suspend a query mid-execution. Accordingly, a user or application may set a flag that specifies not to halt and/or suspend executing queries under any circumstances. Thus, the behavior of the query governor 182 in halting and/or suspending query execution may be overridden.

Figure 3:
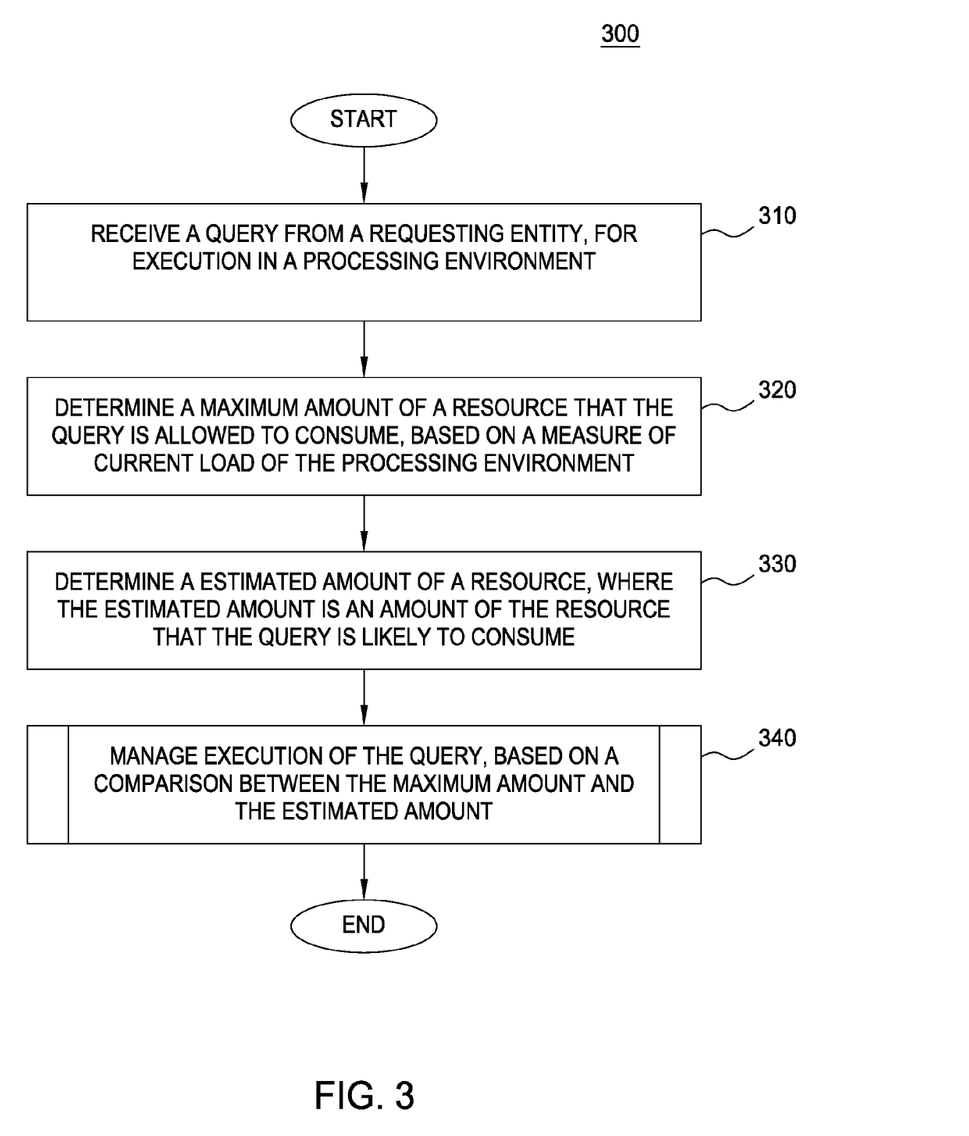
FIG. 3 is a flowchart depicting a method for processing a query, according to one embodiment of the invention.

FIG. 3 is a flowchart depicting a method 300 for processing a query, according to one embodiment of the invention. As shown, the method 300 begins at step 310, where the query governor 182 receives a query from a requesting entity, for execution in a processing environment. For example, the query governor 182 may receive the first query of FIG. 2C. At step 320, the query governor 182 determines a maximum amount of a resource that the query is allowed to consume, based on a measure of current load of the processing environment. For example, the query governor 182 may determine, based on a low system load, that the maximum execution time should be twenty seconds.

At step 330, the query governor 182 determines an estimated amount of the resource, where the estimated amount is an amount of the resource that the query is likely to consume. For example, the query governor 182 may determine that the first query is likely to take sixteen seconds to execute, as represented by the bar 202 in FIG. 2C. At step 340, the query governor 182 manages execution of the query, based on a comparison between the maximum amount and the estimated amount. The step 340 is further described below with reference to the method 400 of FIG. 4. After the step 340, the method 300 terminates.

Figure 4:
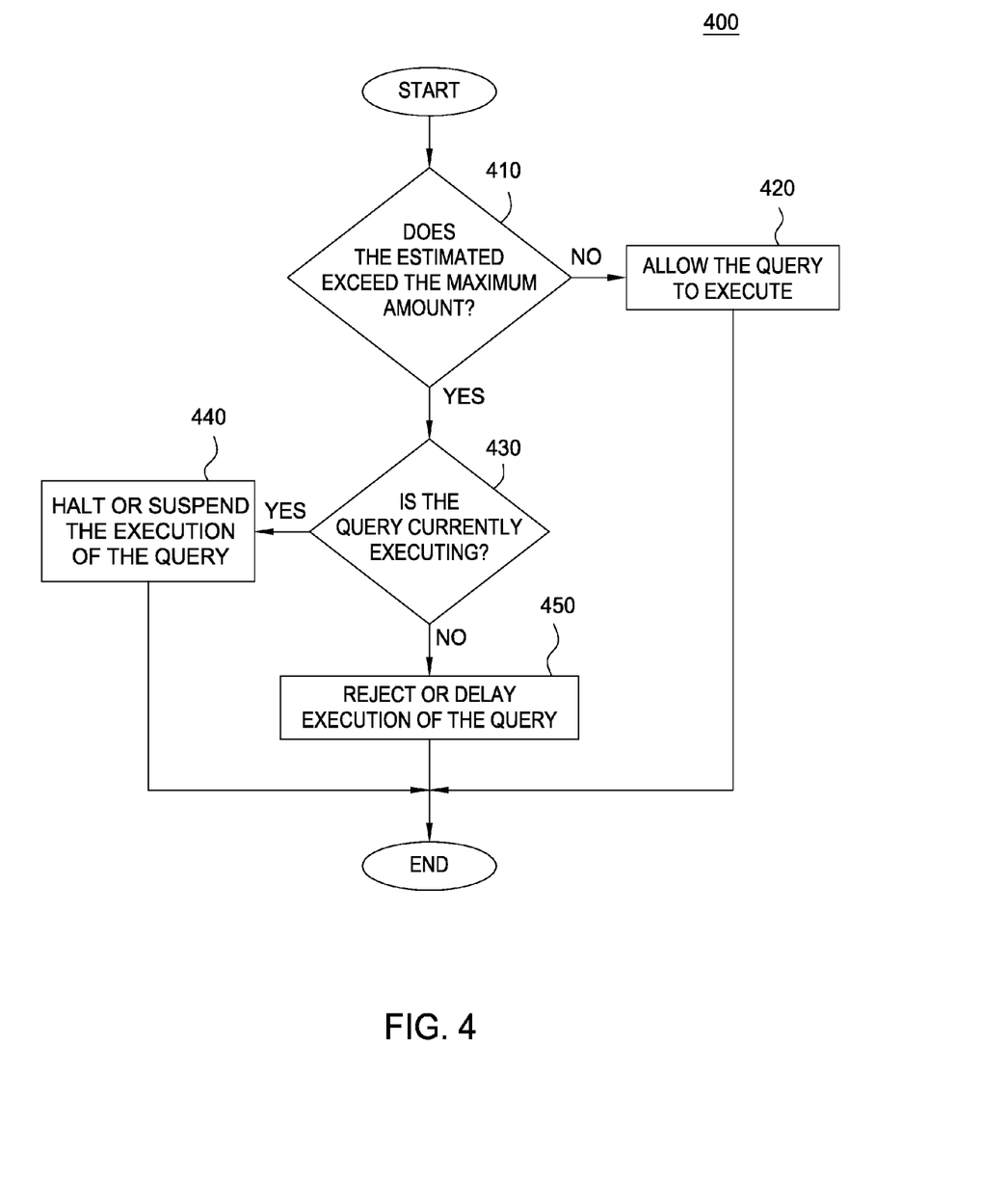
FIG. 4 is a flowchart depicting a method for managing execution of a query, according to one embodiment of the invention.

FIG. 4 is a flowchart depicting a method 400 for managing execution of a query, according to one embodiment of the invention. The method 400 corresponds to the step 340 of FIG. 3. As shown, the method 400 begins at step 410, where the query governor 182 determines whether the estimated amount exceeds the maximum amount, where the estimated and maximum amounts are computed in steps 320 and 330 of FIG. 3, respectively. If the estimated amount does not exceed the maximum amount, then the query governor 182 allows the query to execute (step 420). Allowing the query to execute may include issuing a query for execution or allowing an executing query to complete and/or continue execution.

On the other hand, if the estimated amount exceeds the maximum amount, then the query governor 182 determines whether the query is currently executing (step 430). If so, then the query governor 182 may halt or suspend the execution of the query. If the query is not currently executing (step 430), then the query governor 182 may reject or delay execution of the query (step 450). For example, the query governor 182 may delay execution of the query until the system load is reassessed, by which point system resources may have become idle enough to allow execution of the query. At least in some embodiments, the query governor 182 assesses the system load according to a predefined schedule. For example, the system load may be assessed in five-minute intervals. A user may tailor the schedule to suit the needs of a particular case. The query governor 182 may also return a message to the requesting entity, explaining that execution of the query is denied or delayed. After the step 420, the step 440, or the step 450, the method 400 terminates.

Advantageously, embodiments of the invention provide techniques for query processing. One embodiment provides a query governor that is configured to receive, from a requesting entity, a query for execution in a processing environment. The query governor determines a maximum amount of a resource that the query is allowed to consume, based on a measure of current load of the processing environment. The query governor also determines an estimated amount of the resource, where the estimated amount is an amount of the resource that the query is likely to consume. The query governor then manages execution of the query, based on a comparison between the maximum amount and the estimated amount. Advantageously, the query governor may manage query execution in a manner that is more responsive to the needs of the processing environment.

While the foregoing is directed to embodiments of the present invention, other and further embodiments of the invention may be devised without departing from the basic scope thereof, and the scope thereof is determined by the claims that follow.

What is claimed is:

1. A computer-implemented method to regulate query resource consumption as a function of current load of a processing environment, the computer-implemented method comprising:
   receiving a plurality of queries for execution in the processing environment, the plurality of queries including a first query, a second query, and a third query;
   determining a maximum threshold of a resource that any query is permitted to consume, based on a measure of the current load of the processing environment;
   determining, for each of the first, second and third queries, an estimated amount of the resource likely consumed by the respective query when executed, wherein the estimated amount likely consumed by the respective query does not exceed the maximum threshold;
   issuing the first query for execution, upon determining that the estimated amount of the resource likely consumed by the first query does not exceed the maximum threshold;
   dynamically adjusting the maximum threshold by operation of one or more computer processors, based on one or more changes in the current load over time and without requiring user intervention, including decreasing the maximum threshold responsive to an increase in the current load;
   rejecting or delaying execution of the second query, upon determining that the estimated amount of the second query exceeds the decreased maximum threshold; and
   suspending or aborting the third query mid-execution, upon determining that the estimated amount of the resource likely consumed by the third query exceeds the decreased maximum threshold;
   whereby resource consumption of the first, second, and third queries is regulated as a function of the current load of the processing environment.

2. The computer-implemented method of claim 1, wherein the resource comprises at least one of query execution time, processor cycles, memory, storage capacity, storage bandwidth, and network bandwidth.

3. The computer-implemented method of claim 1, wherein the measure of current load of the processing environment characterizes at least one of processor utilization, memory utilization, utilization of storage capacity, utilization of storage bandwidth, and network utilization.

4. The computer-implemented method of claim 1, wherein execution of the second query is delayed.

5. The computer-implemented method of claim 1, wherein the third query is suspended mid-execution.

6. A computer program product to regulate query resource consumption as a function of current load of a processing environment, the computer program product comprising:
   a computer-readable memory including hardware and having computer-readable program code embodied therewith, the computer-readable program code executable by one or more computer processors to:
      receive a plurality of queries for execution in the processing environment, the plurality of queries including a first query, a second query, and a third query;
      determine a maximum threshold of a resource that any query is permitted to consume, based on a measure of the current load of the processing environment;
      determine, for each of the first, second and third queries, an estimated amount of the resource likely consumed by the respective query when executed, wherein the estimated amount likely consumed by the respective query does not exceed the maximum threshold; issuing the first query for execution, upon determining that the estimated amount of the resource likely consumed by the first query does not exceed the maximum threshold;
      dynamically adjust the maximum threshold based on one or more changes in the current load over time and without requiring user intervention, including decreasing the maximum threshold responsive to an increase in the current load;
      reject or delay execution of the second query, upon determining that the estimated amount of the second query exceeds the decreased maximum threshold; and
      suspend or abort the third query mid-execution, upon determining that the estimated amount of the resource likely consumed by the third query exceeds the decreased maximum threshold;
      whereby resource consumption of the first, second, and third queries is regulated as a function of the current load of the processing environment.

7. The computer program product of claim 6, wherein the resource comprises at least one of query execution time, processor cycles, memory, storage capacity, storage bandwidth, and network bandwidth.

8. The computer program product of claim 6, wherein the measure of current load of the processing environment characterizes at least one of processor utilization, memory utilization, utilization of storage capacity, utilization of storage bandwidth, and network utilization.

9. The computer program product of claim 6, wherein execution of the second query is delayed.

10. The computer program product of claim 6, wherein the third query is suspended mid-execution.

11. A system to regulate query resource consumption as a function of current load of a processing environment, the system comprising:
   one or more computer processors;
   a memory containing a program which, when executed by the one or more computer processors, performs an operation comprising:
      receiving a plurality of queries for execution in the processing environment, the plurality of queries including a first query, a second query, and a third query;
      determining a maximum threshold of a resource that any query is permitted to consume, based on a measure of the current load of the processing environment;
      determining, for each of the first, second and third queries, an estimated amount of the resource likely consumed by the respective query when executed, wherein the estimated amount likely consumed by the respective query does not exceed the maximum threshold; issuing the first query for execution, upon determining that the estimated amount of the resource likely consumed by the first query does not exceed the maximum threshold;
      dynamically adjusting the maximum threshold based on one or more changes in the current load over time and without requiring user intervention, including decreasing the maximum threshold responsive to an increase in the current load;
      rejecting or delaying execution of the second query, upon determining that the estimated amount of the second query exceeds the decreased maximum threshold; and suspending or aborting the third query mid-execution, upon determining that the estimated amount of the resource likely consumed by the third query exceeds the decreased maximum threshold;

whereby resource consumption of the first, second, and third queries is regulated as a function of the current load of the processing environment.

12. The system of claim 11, wherein the resource comprises at least one of query execution time, processor cycles, memory, storage capacity, storage bandwidth, and network bandwidth.

13. The system of claim 11, wherein the measure of current load of the processing environment characterizes at least one of processor utilization, memory utilization, utilization of storage capacity, utilization of storage bandwidth, and network utilization.

14. The system of claim 11, wherein the first, second and third queries are distinct queries, wherein the estimated amount of each of the first, second, and third queries is determined based on historical usage data collected from one or more previously executed queries, wherein the historical usage data is retrieved from a logging component that is configured to log data pertaining to query execution, the data including:
 (i) query execution time;
 (ii) number of processor cycles used in query execution;
 (iii) amount of memory used in query execution;
 (iv) amount of storage capacity used during query execution;
 (v) amount of storage bandwidth used during query execution; and
 (vi) amount of network bandwidth used during query execution.

15. The system of claim 14, wherein the plurality of queries is received from one or more requesting entities, wherein the maximum threshold is, in respective instances, specified in the first query and in a configuration file; wherein the first query is, in respective instances, vendor-specific and vendor-independent; wherein a message is returned to the one or more requesting entities to convey that execution of the second query is delayed and that the third query is suspended mid-execution;

wherein the current load is retrieved from, in respective instances, an operating system and a monitoring component of a database management system that is configured to monitor performance metrics of the database management system.

16. The system of claim 15, wherein the resource consumption of the first, second, and third queries is regulated as a function of the current load of the processing environment, wherein the maximum threshold is further determined based on: (i) a query type; (ii) the one or more requesting entities from which the first query is received; (iii) a user identifier associated with at least one of the first, second and third queries; and (iv) a priority value associated with at least one of the first, second and third queries.

17. The system of claim 16, wherein the plurality of queries is identified based on predefined criteria including one or more issuing applications and one or more tables accessed, wherein the estimated amount that the first query is likely to consume is determined by generating an access plan for the first query and analyzing the access plan to determine an estimated cost for the access plan, wherein the estimated amount for the first query comprises the estimated cost for the access plan, wherein the access plan is analyzed by a query optimizer component of the database management system.

18. The system of claim 17, wherein the maximum threshold and estimated amount are no longer determined when the current load falls below a predefined minimum threshold, wherein the maximum threshold is not dynamically adjusted based on the current load when a first predefined flag is included in a fourth query.

19. The system of claim 18, wherein the first query includes a second predefined flag overriding, in respective instances: (i) halting query execution and (ii) suspending query execution;

wherein the first query specifies a range of permissible values for the maximum threshold that are expressed in terms of, in respective instances: (i) units of resource and (ii) percentages of a default threshold.

20. The system of claim 19, wherein the resource comprises, in respective instances, query execution time, processor cycles, memory, storage capacity, storage bandwidth, and network bandwidth;

wherein the measure of current load of the processing environment characterizes, in respective instances, processor utilization, memory utilization, utilization of storage capacity, utilization of storage bandwidth, and network utilization.

\* \* \* \* \*